Patented Apr. 22, 1924.

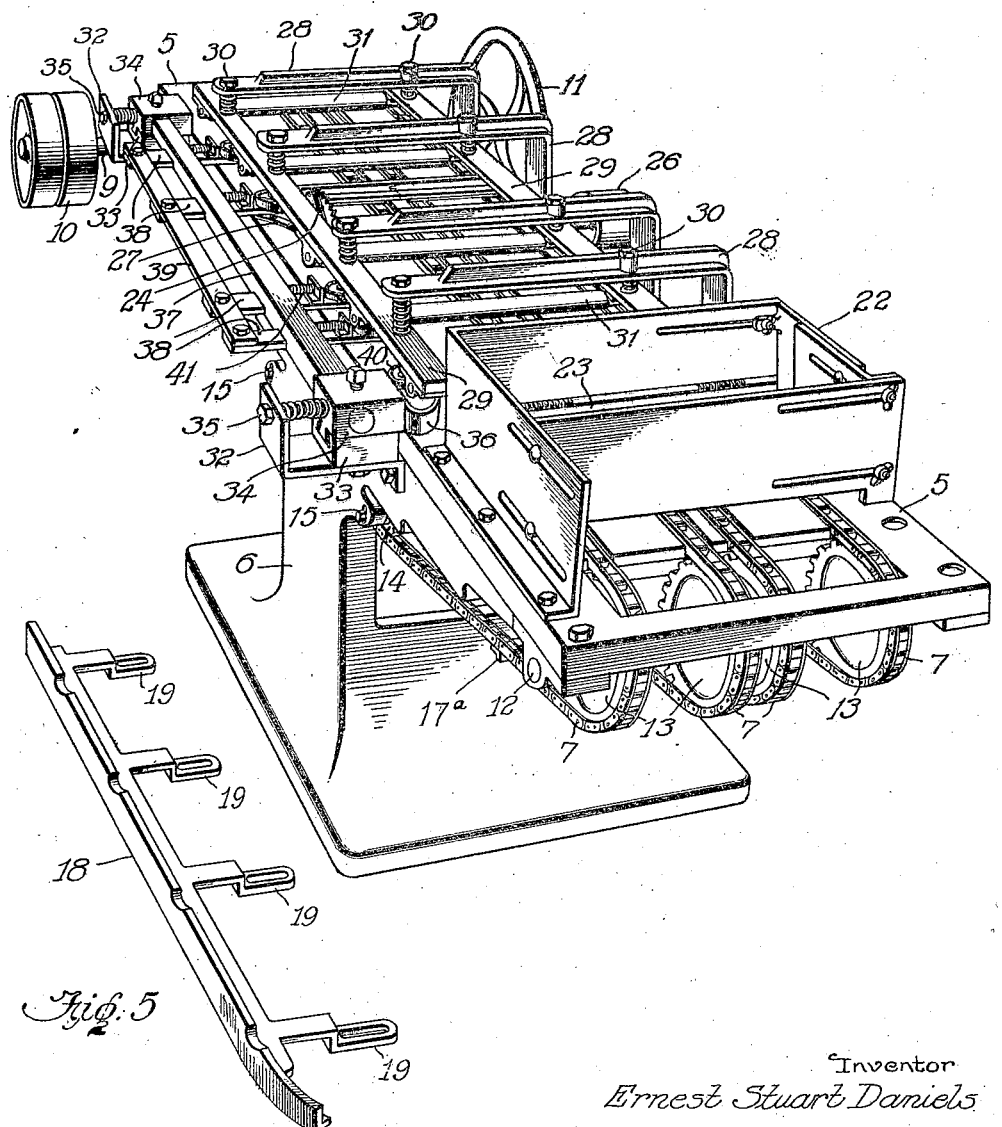

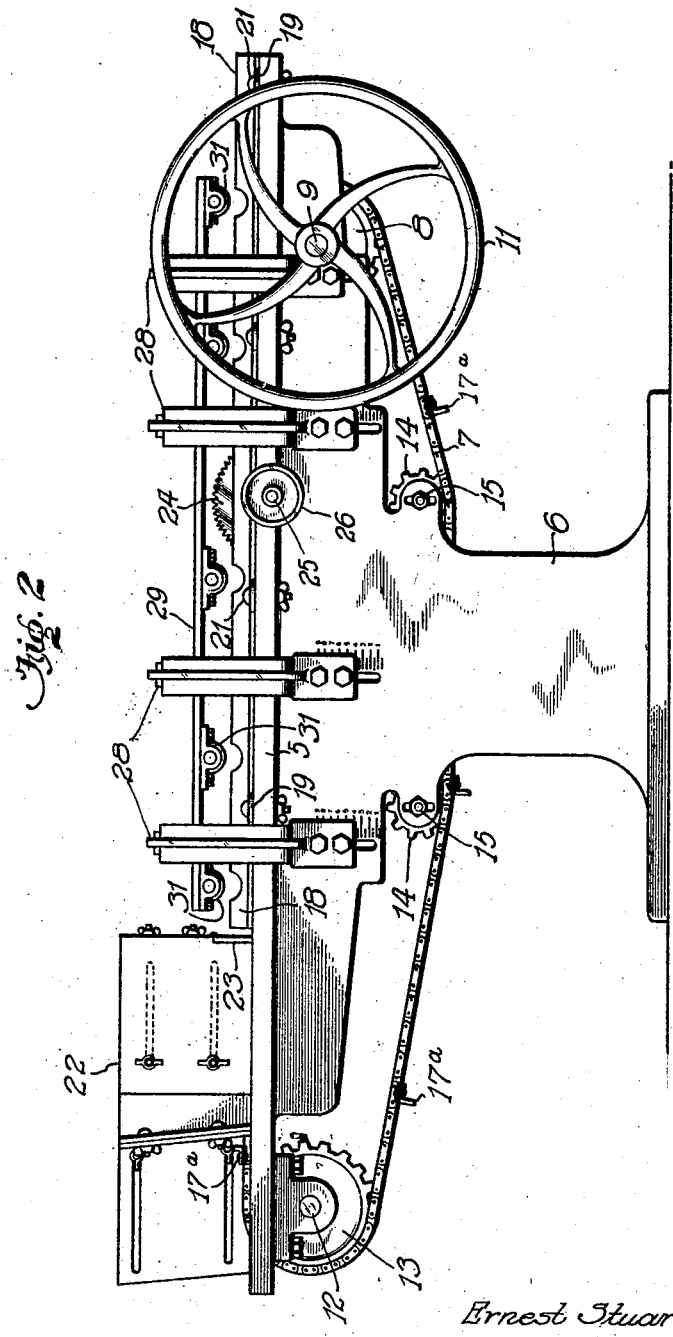

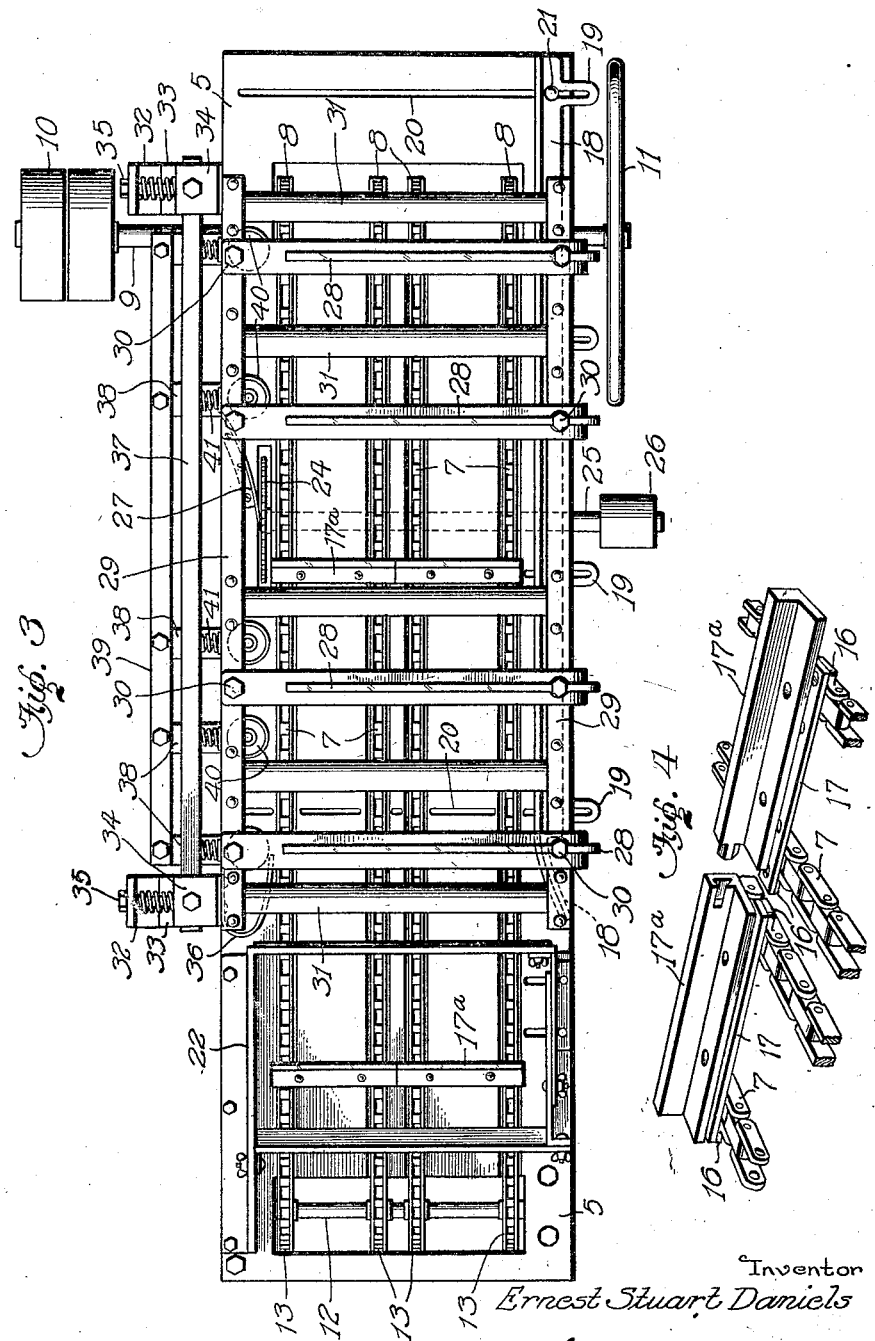

1,491,680

UNITED STATES PATENT OFFICE.

ERNEST STUART DANIELS, OF WASHINGTON, DISTRICT OF COLUMBIA.

AUTOMATIC TRIMMING AND ARTICLE-COMPRESSING MACHINE.

Application filed November 30, 1923. Serial No. 677,717.

*To all whom it may concern:*

Be it known that I, ERNEST STUART DANIELS, a subject of the King of Great Britain, residing at Washington, in the District of Columbia, have invented certain new and useful Improvements in Automatic Trimming and Article-Compressing Machines; and I do hereby declare the following to be a full, clear, and exact description of the invention, such as will enable others skilled in the art to which it appertains to make and use the same.

This invention relates to wood-working machinery and more particularly to an adjustable and automatic trimming and article-compressing machine for accurately cutting or trimming off pieces or lengths of boards, planks or panels, into sections of a desired uniform length or breadth.

The main object of my invention is to provide a machine of the character referred to, which will rapidly cut or trim odd lengths and widths of wooden boards or planks into sections of standard dimension for use in the manufacture of shipping boxes and crates, and which will also rigidly compress or squeeze together, complementary and united pieces of loose or odd flooring material, and cut or trim the same into uniform lengths for use in parquet floor construction, or for other purposes in which large quantities of wooden sections of uniform dimension are required.

Another object is to provide an automatic trimming and article-compressing machine which may be readily and quickly adjusted to cut or trim box-ends or panel sections, and united pieces of loose lumber, to the various uniform dimensions required by different manufacturers in making boxes, crates, floor or wall panel sections or the like, in standard sizes.

A further object is to provide a hopper-fed machine of the character described, which will automatically accommodate itself to articles of irregular length, width or thickness as they are successively fed through the hopper, and rigidly hold each of the articles in place during the cutting or trimming operation.

A still further object is to provide a compressing wood-trimming or cutting machine which will be simple in construction, highly efficient in operation, and comparatively inexpensive of manufacture.

The invention will first be hereinafter more particularly described with reference to the accompanying drawings, which are to be taken as a part of this specification and then pointed out in the claims at the end of the description.

In said drawings, Fig. 1 is a perspective view of the assembled machine embodying my invention.

Fig. 2 is a side elevation of the same.

Fig. 3 is a plan view thereof.

Fig. 4 is an enlarged perspective view of one of the separable and detachable article-engaging cross-bars carried by the conveyor chains, the latter being fragmentarily shown; and, Fig. 5 is a perspective view of the adjustable article guide member or bar extending longitudinally of the machine at the side opposite the cutter.

Referring to the drawings in which like reference numerals are used to designate corresponding parts throughout the several views, 5 denotes a work and element-supporting table or platform, preferably formed of iron or steel, which is rigidly supported at a convenient height from the floor by a standard or pedestal 6, the latter being securable to the floor by any desired means. Endless, continuously moving, cooperable conveyor chains 7, are arranged to move longitudinally of the platform within receptive longitudinal spaced grooves formed in the surface thereof, so that the exposed faces of the moving chains will lie flush with the surface of the platform. Said chains are preferably arranged to operate in pairs and are driven at a uniform speed by sprockets 8, the latter being releasably secured or keyed upon a driven shaft 9 extending transverse the platform and subjacent thereto at one end, said shaft being journaled in bearings located beneath the platform. A two part belt pulley 10 is provided on one end of the shaft 9, by which the latter may be rotatably driven from a suitable source of power, and a hand wheel 11 is conveniently provided on the opposite end of said shaft, in order that it may be manually rotated for the purpose of effecting adjustment of the chains 7, said wheel being preferably releasable from the shaft so that it may idle thereon when the latter is driven by the pulley 10.

Subjacent the opposite end of the platform, an idling shaft 12 is provided, said shaft being journaled in adjustable bearings provided therefor beneath the platform. Sprockets 13 respectively aligned with the chain grooves in the platform and corresponding in number to the chains 7 and sprockets 8, are releasably secured or keyed upon the shaft 12, one of the endless chains 7 being engageably passed over each of the sprockets 13 for a well known purpose. Chain tightening sprockets 14 are provided subjacent the platform intermediate its ends under which the conveyor chains pass and are maintained in alignment, said sprockets being idly rotatable upon shafts 15 having their ends secured in bearings vertically adjustable in slotted lugs formed on the pedestal 6. It will be understood that the respective conveyor chains spanning the distance from sprockets 8 to 13 rest by virtue of their own weight within the receptive grooves provided in the surface of the table as they move longitudinally thereof from end to end.

The chains 7 which are arranged to operate in pairs, are provided at equally spaced intervals with oppositely related links 16, said links being formed with horizontal apertured lugs by means of which cross ties or base plates 17 having orifices at either end, overlying and corresponding with the apertured lugs on said links, may be permanently secured to cooperable pairs of chains. Separable and detachable unitary parts of angular cross-bars 17ª are respectively securable to the plates 17, said parts being of a length equal to, greater or less than the length of the plates 17 as preferred, depending upon the length or width of the articles to be treated. Although a single or any desired number of such parts may be used, said cross-bars 17ª (as shown) for general purposes are preferably formed in two parts, adapted for a dove-tail, tongue and groove connection with each other and are rigidly secured to the plates 17 by small screws or other means. The united parts of the cross-bars 17ª may thus be cooperatively extended transversely across the several chains as shown in Fig. 4 so that the several chains will move in unison. When it is desired to compress or trim very narrow or short pieces of lumber, only one pair of cooperable chains carrying substituted, reduced or short lengths of article-engaging cross-bars 17ª are required, and the unrequired part or parts of the respective cross-bars may therefore be disconnected and removed from the plates 17 and the associated pair of chains, the driven sprockets 8 and 13 over which such pair of chains are engageably passed, being temporarily released to idle upon their respective shafts, so that the unemployed pair of chains will be brought to rest, leaving only the one pair in operation.

An article guide bar 18, formed with a base flange having spaced slotted arm or lug portions 19 horizontally extended therefrom, is provided on the platform 6 at one side thereof, said bar being laterally adjustable across the surface of the table by means of transverse slots 20 provided therein, through which clamping bolts 21 are extended from the corresponding slotted lugs 19 for rigidly securing the bar in place, the ends of said bolts being engaged by wing-nuts which are tightened against the under side of the table.

In Fig. 5, a step formation of the laterally projecting slotted arms 19, of the guide-bar 18, is shown, for accomplishing the desired adjustment over the chains 7; this form being preferable though other suitable forms may be employed for accomplishing the same result.

It will be observed by reference to Fig. 3, that the guide-bar 18 may be moved any desired distance across the platform, and when moved over or beyond the first pair of conveyor chains, the associated parts of the respective cross-bars 17ª are removed therefrom and said pair of chains are preferably brought to rest as above mentioned, although it is not necessary. Any one of the endless chains 7 may readily be brought to rest merely by disconnecting the attached ends of plates 17 and releasing the sprocket 8 (over which the chain passes), from the driven shaft 9, and while I have not shown any means for idling these sprockets on said shaft, it will be understood that this may be effected by any ordinary releasing means without disturbing the position of the sprockets on the shaft.

A hopper 22 is located at one end of the platform, said hopper being endwise and longitudinally adjustable to accommodate pieces of lumber of different lengths and widths, the front side or wall of said hopper being provided with a hinged trap 23 adapted to swing outwardly so that the lowermost board, plank or section within the hopper may be released without disturbing the remaining sections which might otherwise be conveyed therefrom and jam the machine. The rear wall of the hopper is recessed or cut away slightly in order that the spaced cross-bars 17ª carried by and extending above the level of the chains 7, may successively pass thereunder and move through the hopper, to engage and withdraw the lowermost board or plank, and convey the same through the machine for the compressing and trimming operations.

It will be understood that one edge or side of the articles successively withdrawn from the hopper, will engage and be forcibly pressed against the longitudinal guide bar 18, the latter being outwardly curved at its end adjacent the hopper to prevent jamming of the articles thereagainst, said bar serving as a non-yielding "square" and guide for the articles during their progress through the machine. As previously explained, said bar may be moved laterally—across the platform to any desired position in order to accommodate articles of smaller dimension than the maximum dimension for which the machine is designed when the bar is adjusted at its extreme outermost point along the side of the platform. For such purpose one pair of cooperable chains 7 may be brought to rest, and the hopper may be proportionately adjusted to accommodate such articles of smaller dimension, the several parts of the machine being thus adjustable for articles of different lengths or widths, so that comparatively short or narrow, long or wide sections may with equal facility be conveyed through the machine.

At one side of the platform intermediate its ends, a vertical trimming-saw or cutter 24 is provided, said cutter being keyed to one end of a driven shaft 25 and arranged to extend peripherally above the surface of the platform through an elongated recess or slot formed therein. The shaft 24 is journaled in suitable bearings subjacent the platform and is provided at its opposite end with a belt pulley 26 by which it may be rotated from a suitable source of power.

An arcuate deflecting plate 27 is secured upon the platform adjacent the outer face of the saw or cutter 24 for the purpose of throwing the trimmed or sawed off ends of the boards away from the cutter.

Reinforced angular support arms or brackets 28 are provided to extend transversely above the surface of the platform, said brackets being vertically adjustable at their base portions by means of clamping bolts extending through vertical recesses or slots formed in one side of the standard or pedestal 6 below the surface of the platform, as shown in Fig. 2. Graduation marks are preferably cut in the pedestal adjacent each of the vertical slots as an aid in adjusting the brackets 28 to exactly the same height above the surface of the platform. Parallel roller suspension bars 29 are resiliently or yieldingly suspended from the angular supporting brackets 28 by means of loose guide studs or bolts 30, the latter being provided with enlarged heads at either end and encircled by intermediate expansible springs tending to forcibly depress the suspension bars toward the platform.

The roller suspension bars 29, support spaced, idling pressure rollers 31, the latter being provided with extremital pintles journaled in suitable bearing blocks provided on the undersides of the respective bars, said rollers being adapted to exert a yielding pressure upon articles successively conveyed through the machine to hold the same firmly against the surface of the platform. It will be observed by reference to Fig. 2 that arcuate depressions are formed in the adjustable guide-bar 18, in order to prevent binding of the rollers 31 thereagainst when the brackets 28 supporting the bars 29 are lowered to their extreme point.

Opposite the adjustable guide-bar 18, angular brackets or supports 32 are provided on the pedestal at the side of the platform, upon which blocks 33 are swiveled, the upper surfaces of the latter being preferably flush with the surface of the platform, and adapted to engage complementary sliding blocks 34 by means of a tongue and groove connection therebetween, the blocks 34 being normally pressed toward the edge of the platform under the tension of expansible springs supported by reciprocating span bolts 35 and adapted to slide freely back and forth upon the swiveled blocks 33. One of the blocks 34 near the hopper 22, carries a resilient spring-member 36 against which the ends or sides of articles successively conveyed from the hopper must initially press in transit through the machine.

The blocks 34 support a swinging truss-bar 37, the extremities of the latter being formed to fit loosely within recesses provided in said blocks, and tightening screws or bolts may, if desired, be screwed down upon the ends of said bar to prevent its withdrawal therefrom. The truss-bar 37 carries a series of transverse push-bars 38, the free ends of the latter being loosely extended through recesses formed in said bar and pivoted to a common, swinging rod or cross-bar 39. The opposite ends of said push-bars project slightly over one side of the platform at substantially right angles thereto, and carry idling rollers 40 which engage the articles successively conveyed through the machine, tensionally pressing the same against the guide-bar 18, said rollers presenting a slight resistance to the progress of articles conveyed through the machine, in cooperation with the rollers 31, so that complementary pieces of lumber will be compressed together and united in a single rigid section. The bars 38 are respectively provided with compression posts or shoulders intermediate their rollers and the truss-rod 37, and expansible springs 41, supported by loosely connected studs are provided between said shoulders and truss-bar, tending to move the push-bars inwardly under strong tension, in the path of the conveyed articles.

The operation of my improved automatic trimming and article-compressing machine is as follows:

Irregular pieces of loosely joined flooring material, or odd pieces of boards, planks and the like are stacked one upon the other within the hopper 22, the latter being continuously supplied with the articles to be compressed or trimmed, as rapidly as the moving chains 7 will successively convey unitary pieces or sections from the hopper. The cooperable, endless conveyor chains carrying the spaced article-engaging cross-bars 17$^a$, are continuously moved longitudinally along the surface of the platform within their respective grooves, by means of the sprockets 8, which as hereinbefore described, are releasably keyed to the driven shaft 9, carrying a belt pulley by which the shaft may be rotated from a suitable source of power. As the cooperable chains move under and through the hopper 22, the lowermost of the articles stacked therein are successively engaged by one of the separable cross-bars 17$^a$, and withdrawn from the hopper.

As the articles are successively conveyed from the hopper, one end or side of the same will be moved initially into compressive engagement with the resilient spring element 36, by which the articles will be firmly pressed with their opposite ends or sides against the guide-bar 18. If the article is of such dimension that excessive pressure results upon the element 36, the sliding block 34 to which it is secured, will be forcibly moved away from the article against the tension of its associated spring, thereby alleviating the extreme pressure exerted upon the article but applying a compound pressure thereagainst.

As the article continues its passage through the machine in the path of the cutter 24, it will successively engage the respective end pressure-exerting rollers 40 and the transverse surface pressure-exerting rollers 31, so that the article is yieldingly pressed at top and side or edge, to rigidly hold the same against the surface of the platform as it is propelled forwardly by the conveyor chains. If the articles conveyed through the machine, comprise irregular and loosely joined pieces of flooring material the pressure exerted thereupon by the rollers 31, and 40, will squeeze or press the pieces firmly together and unite them in rigid sections. As each article is conveyed through the machine, its edge or side will be "squared" against the guide-bar 18 as a result of the roller pressure thereupon, so that when the article reaches the saw or cutter 24, the latter will trim or cut off the irregular edges (which are discharged from the platform by the deflector plate 27) to exactly the same dimension. After passing the cutter, the article passes to the end of the platform (under the squeezing pressure of rollers 31 and 40) from which it is discharged in finished condition or upon the receptive platform of another machine for further treatment.

If the articles conveyed from the hopper through the machine are of a length or width sufficient to force the roller carrying push-bars 38 outwardly beyond the compression limit of springs 41, the truss-bar 37 will responsively move outwardly from the platform by means of its supporting blocks 34 which slidably move upon the complementary blocks 33 against the tension of their associated springs, thus bringing a compound pressure into play against the edges or ends of the articles. It will be observed that the rollers 31 and 40 are spaced apart sufficiently to act independently upon the edges or sides of articles conveyed through the machine, and the push-bars 38 may move independently against the tension of springs 41 or move as a unit with the bars 37 or 39. Either or both ends of the swinging truss-bar may be forced away from the platform, and it will be readily understood that a compound pressure must result upon the articles conveyed through the machine when both ends of the truss-bar carried by the movable blocks 34, are simultaneously pushed outwardly against the tension of their associated springs.

In like manner, the roller suspension bars 29 may be endwise or intermediately elevated against the tension of the springs encircling the suspension bolts 30 by a contact of the rollers 31 with the surfaces of articles conveyed through the machine, so that the compression of the rollers upon the articles will increase in direct proportion to the upward thrust thereupon.

The saw or cutter 24 as previously described, is keyed to a driven shaft 25 by which it is continuously rotated preferably at a high speed, and said cutter will trim or cut off the odd ends from articles conveyed through the machine, thus producing finished articles of a uniform length or width.

After the articles have been trimmed to the desired width or length, they may be reinserted endwise or lengthwise in the hopper, or at right angles to the position in which they were formerly inserted, and reconveyed through the machine for secondarily trimming the edge adjacent the formerly treated edge, or if preferred, such treated articles may be inserted in the hopper of a similar machine, adjusted to cut or trim to a greater or less dimension, so that finished articles of a uniform length and width may be produced rapidly and in large numbers.

Loosely joined pieces of odd flooring material have been very successfully treated in this manner to form uniform sections for parquet floor construction, and actual tests have shown that my improved machine will squeeze and unite complementary pieces of lumber together so firmly that it is exceedingly difficult to again draw them apart.

Having thus described my invention, what I claim as new and desire to secure by Letters Patent of the United States is:—

1. In an article compressing and trimming machine, the combination with a working platform, of a hopper arranged over said platform adapted to contain articles to be treated, an endless continuously moving conveyor located below said hopper and adapted to remove and convey articles therefrom, a guide-bar extended parallel with the conveyor against which the conveyed articles are pressed, means for trimming or cutting articles while carried by said conveyor and means for pressing the conveyed articles against the surface of the platform and against said guide-bar, said pressing means comprising yielding pressure rollers arranged above the platform held in pressure contact with the surfaces of conveyed articles and compression rollers arranged along a side of the platform adapted to engage and yieldingly press against the edges or sides of the conveyed articles, substantially as described.

2. In an article compressing and trimming machine, the combination with a working platform, of an adjustable hopper arranged over said platform adapted to contain articles to be treated, an endless continuously moving conveyor located below said hopper and adapted to remove and convey articles therefrom, an adjustable guide-bar extending along one side of the platform parallel with the conveyor, means for trimming or cutting the articles while carried by said conveyor, and means for pressing or compressing the conveyed articles, said pressing means comprising transverse pressure rollers yieldingly suspended above the conveyor and held in pressure contact with the surfaces of conveyed articles, and a series of compression rollers arranged along the opposite side of the platform and held in a yielding pressure contact with the edges or sides of the articles as they are conveyed through the machine, substantially as described.

3. In a compressing and trimming machine, the combination with a platform, of an adjustable hopper arranged over said platform adapted to contain articles to be treated, an endless continuously moving conveyor located below said hopper and adapted to successively remove and convey articles therefrom, an adjustable article guide-bar adjacent said hopper extending longitudinally of the platform and parallel with the conveyor against which the conveyed articles are pressed, means for trimming or cutting the articles as they are conveyed through the machine and means for yieldingly pressing or compressing the conveyed articles against the surface of the platform and said guide-bar, said pressing means comprising spaced transverse pressure rollers resiliently suspended above the conveyor and held in pressure contact with the surfaces of conveyed articles, and a spaced series of lateral compression rollers arranged along the opposite side of the platform, the latter being carried by thrust members pivotally united to a common swinging bar and adapted successively to exert a yielding pressure against the edges or sides of articles conveyed through the machine, substantially as described.

4. In a compressing and trimming machine, the combination with a platform, of an adjustable hopper arranged on said platform adapted to contain articles to be treated, an endless continuously moving conveyor located below said hopper and adapted to successively remove and convey articles therefrom, an adjustable article-squaring guide-bar extending longitudinally of the platform and parallel with the conveyor against which the conveyed articles are pressed, means for trimming or cutting the articles as they are conveyed through the machine and means for downwardly and laterally pressing and holding the articles during the trimming operation, said pressing means comprising adjustable brackets supporting spaced, resiliently suspended pressure rollers arranged above the conveyor and held in yielding pressure contact with the surfaces of conveyed articles, and a spaced series of lateral pressure rollers arranged along the opposite side of the platform, compressible thrust members by which the last mentioned rollers are carried and adapted successively to exert a yielding pressure against the edges or sides of articles conveyed through the machine, a yieldable truss bar through which the thrust members are extended and pivotally secured to a common swinging bar, and complementary movable blocks by which said truss bar is yieldingly supported, said yieldable truss bar and said compressible thrust members being cooperatively adapted to exert a compound lateral pressure against articles conveyed through the machine, substantially as described.

5. In a compressing and trimming machine for uniting and trimming pieces of complementary flooring material into rigid sections of uniform dimensions, the combination with a working platform, of an adjustable hopper arranged on said platform adapted to contain odd pieces of unjoined lumber, an endless continuously moving conveyor located below said hopper and associated means for successively removing and conveying pieces of unjoined lumber therefrom, an adjustable guide-bar extending longitudinally of the platform and parallel with the conveyor against which the conveyed pieces are pressed, means for trimming or cutting the pieces to a uniform length while carried by said conveyor, and means for downwardly and laterally compressing the pieces together in a rigid composite section and holding the composite section firmly against the conveyor and guide-bar during the trimming operation, said compressing and holding means comprising adjustable brackets supporting spaced, resiliently suspended pressure rollers arranged above the conveyor and held in yielding pressure contact with the surfaces of conveyed pieces of lumber, and a spaced series of lateral pressure rollers arranged along the opposite side of the platform, compressible thrust members by which the last mentioned rollers are carried and adapted to exert a yielding pressure against the edges or sides of the conveyed pieces, a yieldable truss bar through which the thrust members are extended and pivotally secured to a common swinging bar, and complementary movable blocks by which said truss bar is yieldingly supported, said yieldable truss bar and said compressible thrust members, together with said suspended pressure rollers, being adapted to exert a compound pressure against the respective complementary pieces of lumber, to unite the same in a rigid composite section, substantially as described.

6. In an article compressing and trimming machine, the combination with a working platform, of a hopper arranged over said platform adapted to contain articles to be treated, an endless continuously moving conveyor located below said hopper and adapted to remove and convey articles therefrom, a guide-bar extending along one side of the platform substantially parallel with the conveyor, means for trimming or cutting the articles while carried by said conveyor, and means for pressing or compressing the conveyed articles, said pressing means comprising horizontally disposed pressure rollers yieldingly suspended above the conveyor and held in pressure contact with the surfaces of conveyed articles, and compression rollers revoluble at substantially right angles to said horizontally disposed rollers arranged along the opposite side of the platform and held in yielding pressure contact with the edges or sides of the articles as they are conveyed through the machine.

7. In a compressing and trimming machine, the combination with a platform, of a hopper arranged on said platform adapted to contain articles to be treated, an endless continuously moving conveyor located below said hopper and adapted to successively remove and convey articles therefrom, an article-squaring guide-bar extending longitudinally of the platform and substantially parallel with the conveyor against which the conveyed articles are pressed, means for trimming or cutting the articles as they are conveyed through the machine, and means for downwardly and laterally pressing and holding the articles during the trimming operation, said pressing means coomprising brackets supporting spaced, resiliently suspended pressure rollers arranged above the conveyor and held in yielding pressure contact with the surfaces of conveyed articles, and a spaced series of lateral pressure rollers arranged along the opposite side of the platform, compressible thrust members by which the last mentioned rollers are carried and adapted successively to exert a yielding pressure against the edges or sides of articles conveyed through the machine, a yieldable truss bar through which the thrust members are extended and pivotally secured to a common swinging bar, and complementary movable blocks by which said truss bar is yieldingly supported, said yieldable truss bar and said compressible thrust members being co-operatively adapted to exert a compound pressure against the articles conveyed through the machine, substantially as described.

8. In a compressing and trimming machine for uniting and trimming pieces of complementary flooring material into rigid sections of uniform dimension, the combination with a working platform, of a hopper arranged on said platform adapted to contain odd pieces of unjoined lumber, said hopper having opposite side and end pieces which are adjustable toward and from each other so as to enlarge or diminish the size thereof, an endless continuously moving conveyor located below said hopper and associated means for succesively moving and conveying pieces of unjoined lumber therefrom, a guide bar extending longitudinally of the platform and substantially parallel with the conveyor against which the conveyed pieces are pressed, means for trimming or cutting the pieces to a uniform length while carried by said conveyor, and means for downwardly and laterally compressing the pieces together in a rigid composite section and holding the composite section firmly against the conveyor and against said guide-bar during the trimming operation, said compressing and holding means comprising brackets supporting spaced, resiliently suspended horizontally disposed pressure rollers arranged above the conveyor and held in yielding pressure contact with the surfaces of conveyed pieces of lumber, and a spaced series of lateral pressure rollers arranged along the opposite side of the platform revoluble at substantially right angles to said horizontally disposed rollers, compressible thrust members by which the last mentioned rollers are carried and adapted to exert a yielding pressure against the edges or sides of the conveyed pieces, a yieldable truss bar through which the thrust members are extended and pivotally secured to a common swinging bar, and complementary movable blocks by which said truss bar is yieldingly supported, said yieldable truss bar and said compressible thrust members, together with said suspended pressure members, being adapted to resist the progressive movement of the pieces of lumber carried by the conveyor and exert a compound pressure against complementary pieces to unite the same in a rigid composite section, substantially as described.

In testimony whereof I affix my signature in the presence of two witnesses.

ERNEST STUART DANIELS.

Witnesses:
ARTHUR G. WHITE,
E. HARRY LANDBERG.